(12) United States Patent
Pelletier et al.

(10) Patent No.: US 8,331,745 B2
(45) Date of Patent: Dec. 11, 2012

(54) ASSEMBLY FOR APPLYING A TEMPERATURE GRADIENT TO A REFRACTIVE INDEX GRATING AND CHROMATIC DISPERSION COMPENSATOR

(75) Inventors: Francois Pelletier, Saint-Augustin-de-Desmaures (CA); Martin Pelletier, Saint-Jean-Chrysostome (CA); Pierre Bernard, Quebec (CA); Simon Savard, Quebec (CA)

(73) Assignee: Teraxion Inc., Quebec (CA)

( * ) Notice: Subject to any disclaimer, the term of this patent is extended or adjusted under 35 U.S.C. 154(b) by 137 days.

(21) Appl. No.: 12/727,046

(22) Filed: Mar. 18, 2010

(65) Prior Publication Data

US 2011/0069928 A1    Mar. 24, 2011

Related U.S. Application Data

(60) Provisional application No. 61/161,119, filed on Mar. 18, 2009.

(51) Int. Cl.
*G02B 6/34* (2006.01)
(52) U.S. Cl. ......................................... 385/37
(58) Field of Classification Search .................. 385/37
See application file for complete search history.

(56) References Cited

U.S. PATENT DOCUMENTS

| | | |
|---|---|---|
| 5,671,307 A | 9/1997 | Lauzon et al. |
| 5,987,200 A | 11/1999 | Fleming et al. |
| 6,351,585 B1 | 2/2002 | Amundson et al. |
| 6,842,567 B2 | 1/2005 | Lachance et al. |
| 6,937,793 B2 | 8/2005 | Lelievre et al. |
| 7,379,640 B2 | 5/2008 | Matsumoto et al. |
| 7,711,224 B1 | 5/2010 | Pelletier et al. |
| 2002/0048430 A1 | 4/2002 | Hashimoto et al. |
| 2002/0141700 A1* | 10/2002 | Lachance et al. ............... 385/37 |
| 2003/0198434 A1* | 10/2003 | Lachance et al. ............... 385/37 |
| 2006/0215961 A1* | 9/2006 | Kuhara ........................... 385/37 |

FOREIGN PATENT DOCUMENTS

| | | |
|---|---|---|
| EP | 0867736 A2 | 9/1998 |
| JP | 2000252920 A | 9/2000 |
| JP | 2007264651 A | 10/2007 |

* cited by examiner

*Primary Examiner* — Jerry Blevins
(74) *Attorney, Agent, or Firm* — Baker & Hostetler LLP (57) ABSTRACT

A power efficient assembly is provided for applying a temperature gradient to a Fiber Bragg grating. The assembly includes inner and outer enclosures, the outer enclosure defining an insulation chamber around the inner enclosure. The respective ends of the inner and outer enclosures are in thermal contact. A heat exchange system, such as coiled resistive wires or thermo-electric coolers, applies different temperatures to the opposite ends of the outer enclosure.

20 Claims, 8 Drawing Sheets

FIG. 1A (Prior Art) $T_\infty < T_c$

FIG. 1B (Prior Art) $T_\infty > T_c$

FIG. 1C (Prior Art) $T_\infty = T_c$

ASSEMBLY FOR APPLYING A TEMPERATURE GRADIENT TO A REFRACTIVE INDEX GRATING AND CHROMATIC DISPERSION COMPENSATOR

CROSS-REFERENCE TO RELATED APPLICATIONS

This application claims priority to U.S. Provisional Patent Application No. 61/161,119, filed on Mar. 18, 2009, the disclosure of which is incorporated herein by reference in its entirety.

FIELD OF THE INVENTION

The present invention generally relates to optical gratings and more particularly concerns an improved assembly for applying a temperature gradient on such gratings.

BACKGROUND OF THE INVENTION

A temperature gradient can be induced in an optical fiber containing a fiber Bragg grating (FBG) in order to change the characteristic spectral response of the grating. Such thermally adjustable devices are very useful for optical communication systems as well as other applications. Various techniques are known in the art to impose a temperature change or gradient to a FBG for various purposes. For example, uniform heating along the length of the grating allows shifting the spectral response of the device, while a variable heating along said length allows adjusting the bandwidth and/or dispersion of the grating.

U.S. Pat. No. 6,842,567 ("the '567 patent"), issued on Jan. 11, 2005, shows examples of assemblies useful for applying a temperature gradient to a FBG. The temperature gradient is produced in a heat conductive element, with which the FBG is in continuous thermal contact, and heat pumping devices controlling the temperature of the ends of the heat conductive element. A first preferred embodiment includes a heat recirculation member allowing the recirculation of heat between the two ends of the heat conductive elongated element, thereby providing a rapid and dynamical tuning of the temperature gradient with a minimal heat loss. A second embodiment provides isolation from the surrounding environment in order to decouple the desired temperature gradient from ambient temperature fluctuations, thereby improving the control of the optical response of a fiber grating. This isolation can for example be provided by inserting the elongated element in a vacuum chamber within an insulating enclosure.

In many applications, the thermal gradient applied to the grating should ideally be linear. In principle, a linear temperature gradient can be created between the ends of an elongated element, such as in the '567 patent, for example, if the ends are maintained at different temperatures and if heat transport takes place only between these ends. In practice, heat loss from the elongated element to the surroundings distorts the thermal gradient whose profile therefore diverges from the theoretical linear form. In order to improve the linearity of the thermal gradient along the conductive elongated element, these heat loss mechanisms between the elongated element and the surroundings should be minimized.

Figure 1A:
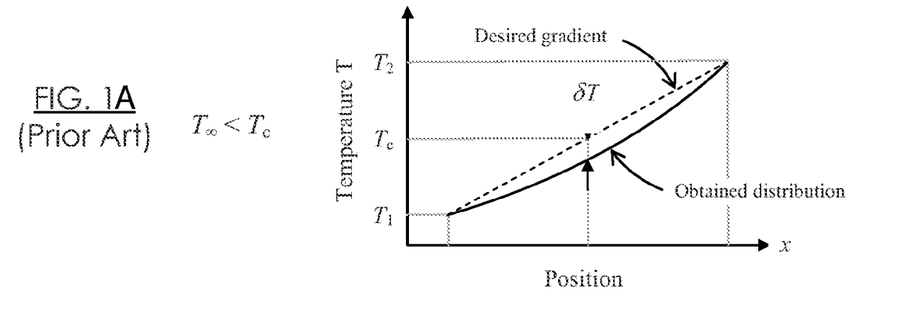
FIGS. 1A to 1C (Prior Art) are graphs illustrating the discrepancy from an ideal linear temperature gradient caused by heat loss to the surroundings in non-isolated systems, for different cases of ambient (smaller, larger, or equal) temperature levels.
Figure 1B:
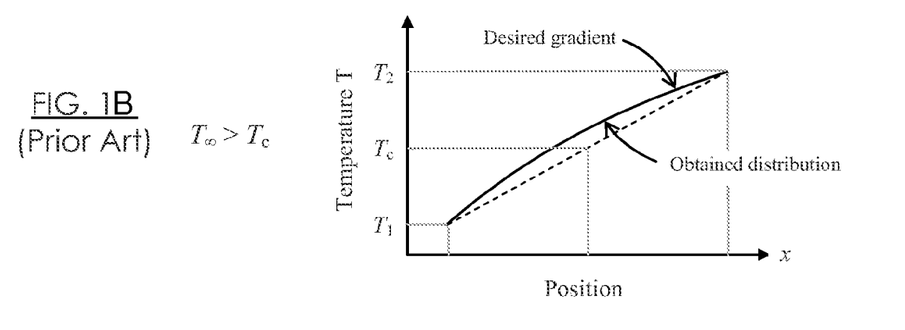
Figure 1C:
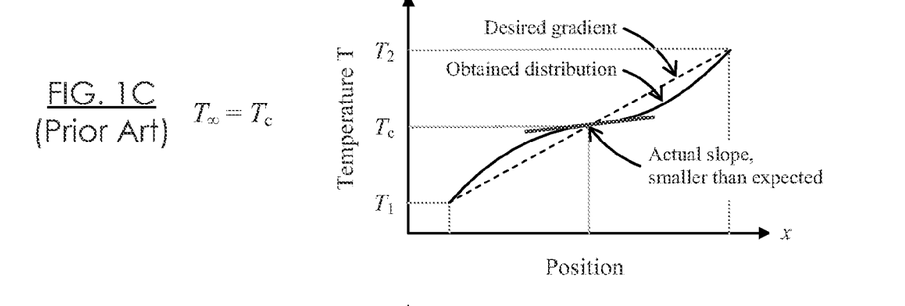

As the low emissivity of a metallic elongated element reduces radiative losses, the heat loss in typical temperature gradient assemblies mainly stems from conduction in the air, since the distance between the two elements is usually minimized to avoid convection. FIG. 1A (Prior Art) illustrates the effect of conductive heat loss on the temperature gradient along the elongated element when the average of the temperature at both ends of the elongated element is than warmer than the surroundings ($T_c > T_\infty$). The heat loss is seen to distort the thermal gradient, the temperature distortion being indicated as $\delta T$ in the graph. FIG. 1B (Prior Art) illustrates the effect of convective heat loss on the temperature gradient along the elongated element when the average of the temperature at both ends is colder than the surroundings ($T_c < T_\infty$). FIG. 1C (Prior Art) illustrates the effective temperature gradient along the elongated element when the environment temperature is equal to the average temperature between both extremities ($T_\infty = (T_1+T_2)/2 = T_c$, as is the case when the grating is secured in an insulating enclosure, as taught by the '567 patent.

As seen from FIG. 1C, in order to minimize discrepancies, temperature in the immediate surroundings of the elongated element can be fixed at the midpoint value between the two extremities ($T_c = (T_1+T_2)/2$), but there still remains an inversed S-shape temperature profile. This has the effect of lowering the magnitude of the effective temperature profile slope in the middle of the useful bandwidth, where the slope can be from 20 to 30% smaller than the imposed gradient, as seen in FIG. 1C. Larger gradients are therefore required in order to reach the originally intended temperature slope. In order to correct for this effect, the group delay profile of the gratings can be overcompensated in the opposite direction, but such an approach is a tradeoff intended for correcting the highest dispersion settings (i.e. at the strongest gradient), and results in imperfect matches for smaller dispersion settings. Moreover, in order to cover the whole originally intended tuning range, larger gradients must be used, which is not always possible, and at best requires operation at higher temperatures and increased power consumption.

In view of the above, there is therefore a need for an improved assembly for applying a thermal gradient to a FBG or the like.

SUMMARY OF THE INVENTION

In accordance with an aspect of the present invention, there is provided an assembly for applying a temperature gradient to a refractive index grating provided in a section of an optical fiber. The assembly first includes a heat conductive inner enclosure having opposite ends and a longitudinal axis extending therebetween. The inner enclosure defines a cavity therein extending along the longitudinal axis and receiving the section of optical fiber therethrough. The assembly further includes a heat conductive outer enclosure provided around the inner enclosure and having opposite ends. Each end of the outer enclosure is in thermal contact with a corresponding end of the inner enclosure. The outer enclosure defines an insulation chamber surrounding the inner enclosure. The assembly also includes a heat exchanging system for imposing a temperature gradient along the outer enclosure.

In accordance with another aspect of the invention, there is also provided a chromatic dispersion compensator, which includes at least one section of optical fiber. Each section of optical fiber has a refractive index grating therealong. The chromatic dispersion compensator further includes an assembly for applying a temperature gradient to the refractive index grating in each of section of optical fiber. The assembly includes:

- a heat conductive inner enclosure having opposite ends and a longitudinal axis extending therebetween, the inner enclosure defining a cavity therein extending along the longitudinal axis and receiving each of the at least one section of optical fiber therethrough;

a heat conductive outer enclosure provided around the inner enclosure and having opposite ends, each end of the outer enclosure being in thermal contact with a corresponding ends of the inner enclosure, the outer enclosure defining an insulation chamber surrounding the inner enclosure; and a heat exchanging system for imposing a temperature gradient along the outer enclosure.

Other features and advantages of the present invention will be better understood upon reading of preferred embodiments thereof with reference to the appended drawings.

DETAILED DESCRIPTION

The present invention generally relates to a simple and practical assembly for applying a temperature gradient to a refractive index grating. Such a device allows for the dynamical tuning of the optical properties of a grating such as, for example, its chromatic dispersion.

Throughout the present description, the expressions "refraction index grating", "Bragg grating" or simply "grating" are used interchangeably to refer to any periodic or aperiodic refractive index pattern permanently induced in a waveguide segment, the expression "fiber Bragg grating" or "FBG" being used in the art when the waveguide segment is an optical fiber. In typical applications, a Bragg grating has a spectral response which includes one or more wavelength channels, that is, the reflection or transmission profile of the grating as a function a wavelength includes a peak or a plurality of generally periodical features. For many applications, for example in the telecommunications industry, it is often desirable that the Bragg grating defines channels of uniform width and spacing, but the present invention could equally be applied to cases where it is not so.

In one aspect of the invention, the device for applying a temperature gradient could be part of a chromatic dispersion compensator. The term "dispersion compensator" is used herein to refer to a device which is designed to induce a predetermined chromatic dispersion in a light signal propagating therein. In typical applications, the chromatic dispersion induced by a compensator is opposite to the chromatic dispersion experienced by the light signal as it travelled or propagates along a waveguide.

The expression "chromatic dispersion" refers to the spreading of a light pulse as it travels along a dispersive medium resulting from the fact that light at different wavelengths travels at slightly different speeds. Dispersion compensators according to embodiments of the invention are particularly adapted to compensate for chromatic dispersion in multi-channel light signals. An example of application of such compensators is for Wavelength-Division-Multiplexing (WDM) communication systems, in which the transmitted information is encoded in light pulse using different wavelength channels. A multi-channel light signal is therefore a light beam susceptible to carry information in one or more wavelength channels within a predetermined spectral band.

A "temperature gradient" is a variation of temperature along a given axis. Changing the temperature along the optical fiber section hosting a Bragg grating will change the dispersion characteristics of the corresponding wavelength channels, providing a useful tool to "tune" the grating. Explanations and examples of the impact of temperature gradients in the context of a dispersion compensator can be found in U.S. patent application Ser. No. 12/209,779 ("the '779 application"), filed on Sep. 12, 2008, the contents of which are incorporated herein by reference in its entirety.

Aside from dispersion compensators, assemblies applying a temperature gradient according to embodiment of the invention may be useful for numerous other applications such as an adjustable pulse stretcher and pulse compressor for ultra-fast lasers, the tunable dispersion management of lasers, especially ultra-fast lasers, laser cavity dispersion adjustment, tunable large and narrow bandwidth filters, tunable reflectivity FBG reflectors, tunable polarization mode dispersion FBG filters, fine tuning of phase-shifted gratings, fine tuning of FBG Fabry-Perot cavities, etc.

Figure 4:
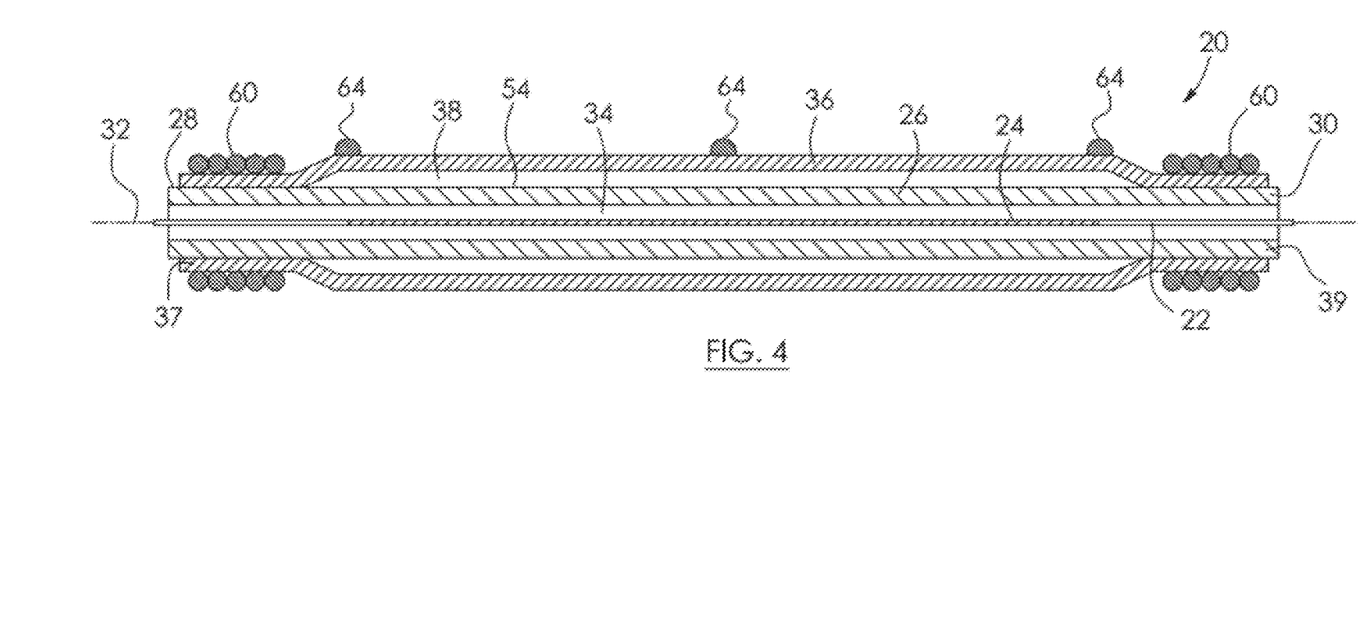
FIG. 4 is a longitudinal cross-sectional side view of an assembly for applying a temperature gradient according to one embodiment of the present invention.

Referring to FIG. 4, there is shown a power efficient assembly 20 for applying a temperature gradient to a refractive index grating 24 provided in a section of optical fiber 22, according to one embodiment of the invention.

The assembly 20 generally includes a heat conductive inner enclosure 26, having opposite first and second ends 28 and 30 and a longitudinal axis 32 extending therebetween. The inner enclosure 26 defines a cavity 34 along the longitudinal axis 32 receiving the section of optical fiber 22. Preferably, the portion of the fiber 22 containing the Bragg grating 24 is located at the center of the length of the inner enclosure 26.

A heat conductive outer enclosure 36 is provided around the inner enclosure 26, and defines an insulation chamber 38 surrounding the inner enclosure 26. The outer enclosure 36 has opposite ends 37 and 39 in thermal contact with a corresponding end 28 and 30 of the inner enclosure 26. By "thermal contact" it is understood that the corresponding ends of the inner and outer enclosures 26 and 36 are coupled in a manner providing an efficient transfer of heat therebetween. As will be explained further below, the provided arrangement of inner and outer enclosures 26 and 36 ensures a more uniform transfer of heat to the enclosed grating 24.

In accordance with one aspect of the invention, a heat exchanging system imposes a temperature gradient along the outer enclosure 36. In the illustrated embodiment of FIG. 4, the heat exchange system includes a pair of resistive elements 60, each resistive element being in contact with a respective end 37 and 39 and the outer enclosure 36. The resistive elements 60 are heated so that they each keep the corresponding ends 37 and 39 of the outer enclosure 36 at different temperatures, which thereby imposes a temperature gradient along the outer enclosure 36. As the opposite ends 28 and 30 of the inner enclosure 26 are in thermal contact with the corresponding ends 37 and 39 of the outer enclosure 36, the inner enclosure 26 is subjected to substantially the same thermal gradient as the outer enclosure 26. Viewed differently, heat applied at the first end 37 of the outer enclosure is directly transferred to the first end 28 of the inner enclosure, heat applied at the second end 39 of the outer enclosure is directly transferred to the second end 30 of the inner enclosure, and the same temperature difference exists between the opposite ends of both enclosures, thereby creating a same temperature gradient therein along the longitudinal axis.

Figure 1D:
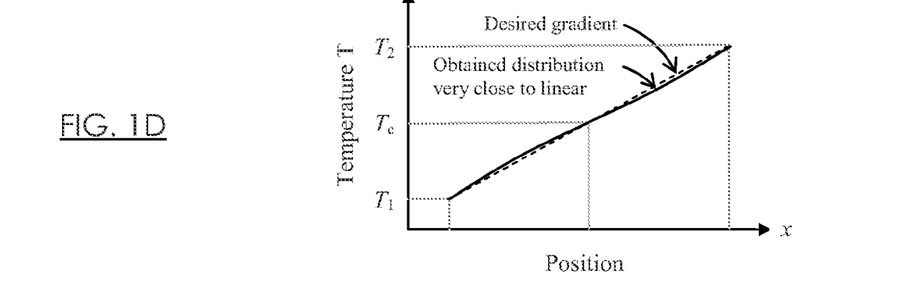
FIG. 1D illustrates a gradient obtained with embodiments of the present invention.

As stated above, heat loss from the conductive inner enclosure to the surroundings must be minimized in order to preserve the linearity of the thermal gradient created therein. Inserting the inner enclosure 26 in the outer enclosure 36 thermally isolated the inner enclosure 26 from the surroundings, providing a first level of insulation. Furthermore by putting both the inner enclosure 26 and the outer enclosure 36 in thermal contact at their extremities and applying the temperature change on the whole assembly, the outer enclosure provides a guiding thermal gradient in itself to the innermost inner enclosure containing the optical fiber. The fact that the enclosures share part of the gradient imposed by the two heat points at the extremities improves the linearity of the gradient in the inside inner enclosure, as can be seen by comparing the obtained gradient on FIG. 1D with the prior art result of FIG. 1C.

Figure 2:
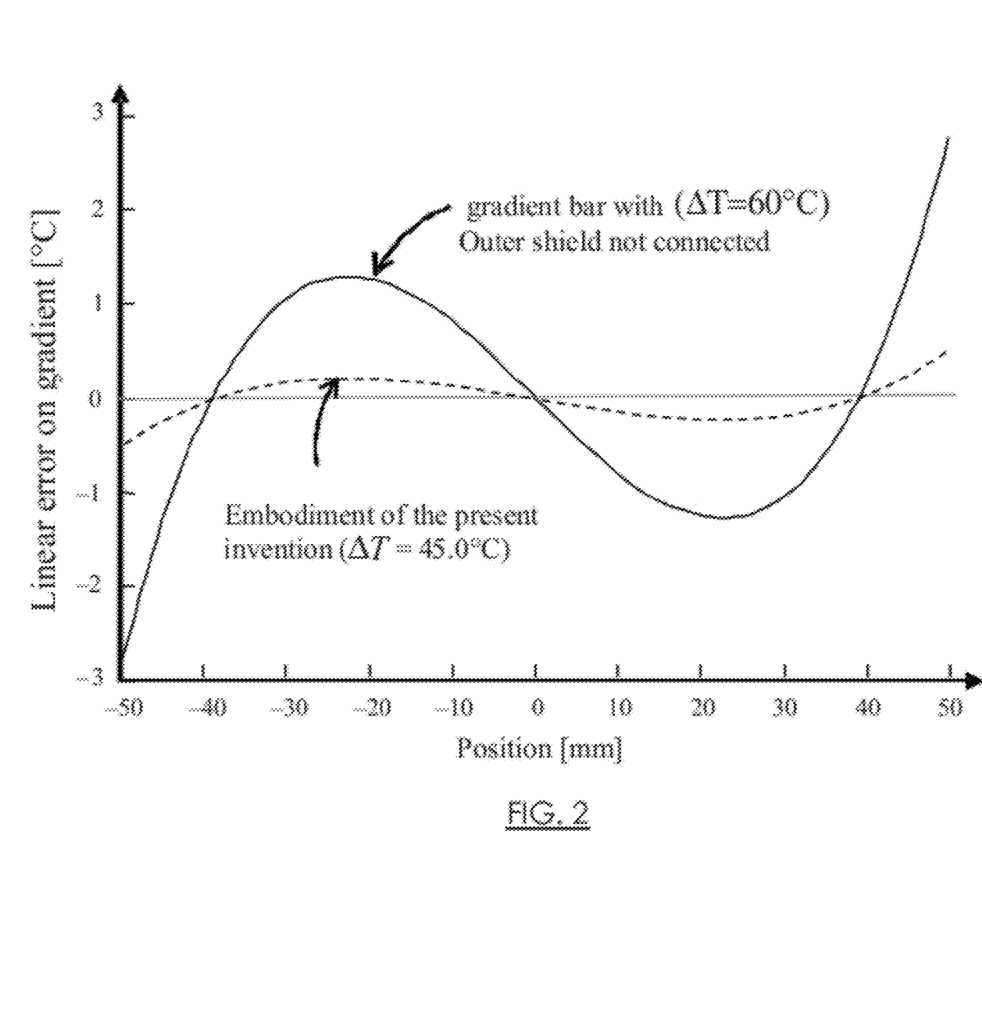
FIG. 2 shows a theoretical simulation of residual error from a linear gradient showing the improvement obtained with an embodiment of the present invention with respect to the prior art.
Figure 3A:
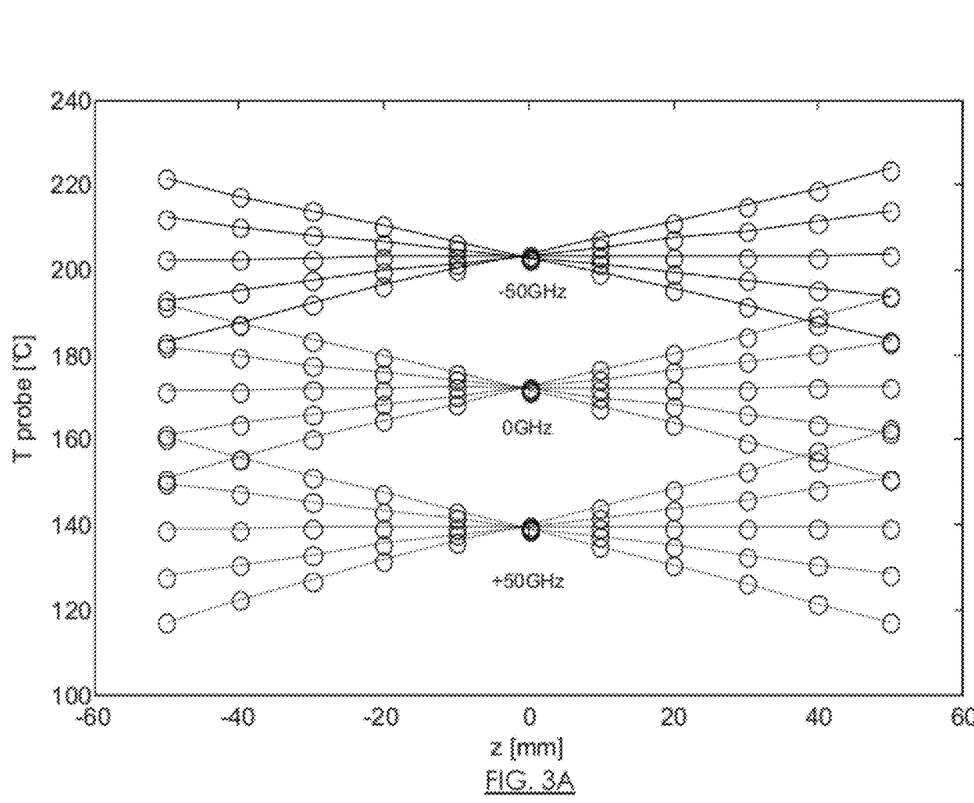
FIGS. 3A and 3B present experimental results of thermal gradients and residual error from the purely linear thermal gradient, respectively, using embodiments of the present invention.
Figure 3B:
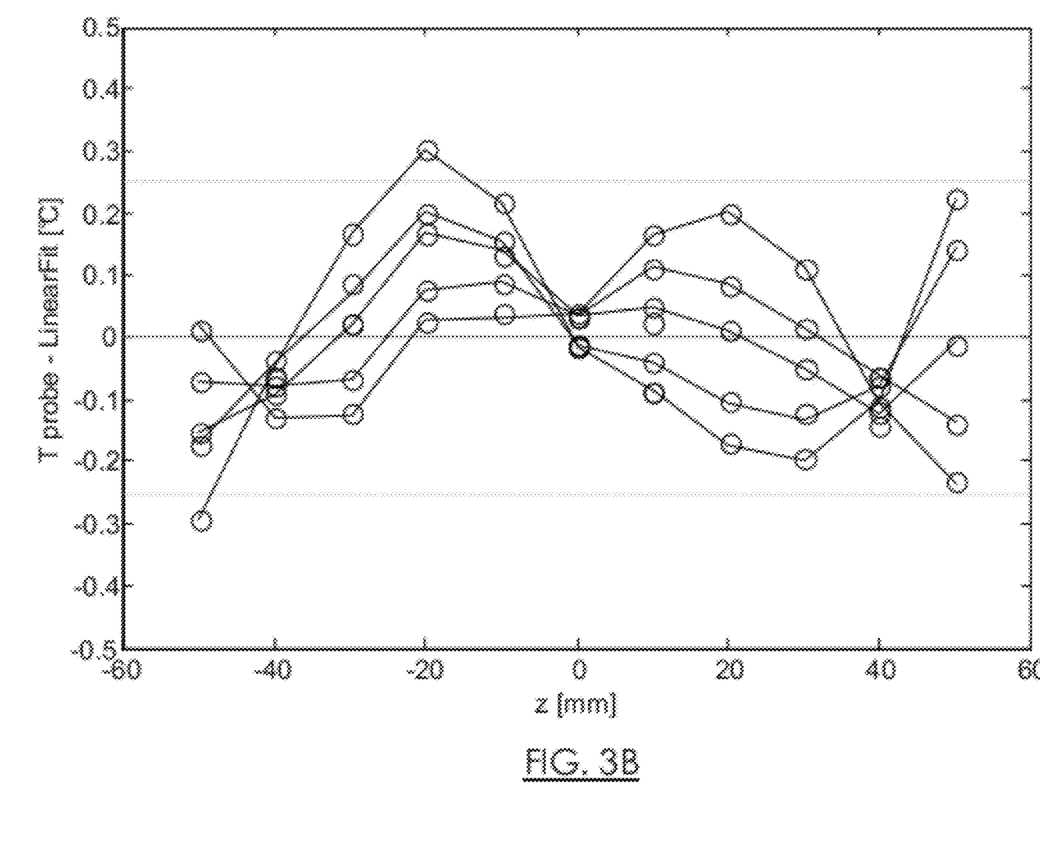

FIG. 2 shows from theoretical simulations that a significant improvement can be obtained using embodiments of the invention. Experimental results shown in FIG. 3A show different temperature gradients obtained on three 50 GHz ITU grid (+50 GHz, 0 GHz, –50 GHz), and FIG. 3B demonstrate that the residual error (shown for the 0 GHz grid) stays well centered and relatively small.

One skilled in the art will readily understand that the thickness of the outer enclosure is preferably optimized, as walls which are too thick will induce too much conduction (the conduction being equal to ΔT×surface), while walls which are too thin will not allow enough heat propagation for proper gradient build-up and will be influenced by exterior temperature. The cavity of the inner enclosure can be embodied by a layer air, gas or vacuum between the inner and outer tubes defined by the inner enclosure and outer enclosure. In the case of air, convection within the chamber should be avoided, since it would severely degrade the thermal insulation. To this end, the air gap must be kept thin enough that buoyancy forces cannot overcome the resistance imposed by the viscous forces of air. The maximum allowable air thickness can be determined from existing art. The spacing/thickness of the cavity/isolation chamber are also factors, as not enough separation will cause the "S" to appear. The isolation chamber should be wide enough to avoid the transfer of the S that still builds on the external wall of the outer enclosure onto the inner enclosure. Emissivity of the outer enclosure walls is also to be taken into account. One skilled in the art will be able to optimize these parameters depending on the target size, geometry and particularities of a given device.

The assembly 20 of FIG. 4 as described above is a first example of a structure embodying the present invention. Preferably, the inner and outer enclosures 26 and 36 are made of a metallic conductor allowing a uniform transfer of heat therealong, such as for example Ag, Cu, Al, or any high thermal conductivity alloy. The ends 28, 30, 37 and 39 of either enclosures 26 and 36 and the remaining central portion of that enclosure can be made of different materials or from a common material. Either of the inner and outer enclosures can be embodied by a one-piece tube or be composed of an assembled combination of shells. In the illustrated embodiment, the corresponding ends 28, 30, 37 and 39 of the inner and outer enclosures 26 and 36 are sealed together in order to provide an airtight fit, such a seal being for example embodied by at least one of a gluing, crimping, soldering, brazing and press fitting bond 52 or the like. For further improving the performance of the device, the exterior surface 54 of the inner enclosure 26 may be provided with a mirror finish providing a low emissivity construction.

Preferably, the heat conductive inner enclosure 26 is a tube freely receiving the section of optical fiber 22 in the cavity 34. The optical fiber may be secure in place within the cavity 34 through any appropriate means, such as gluing to an anchoring point (not shown) provided at extremities of the device. It is to be noted that the optical fiber may or may not be mechanically coupled to the enclosures one skilled in the art will know to take into account such a coupling, as it may affect the length of the fiber (and therefore the optical properties of grating) when the enclosures undergo expansion or contraction with temperature.

Figure 6:
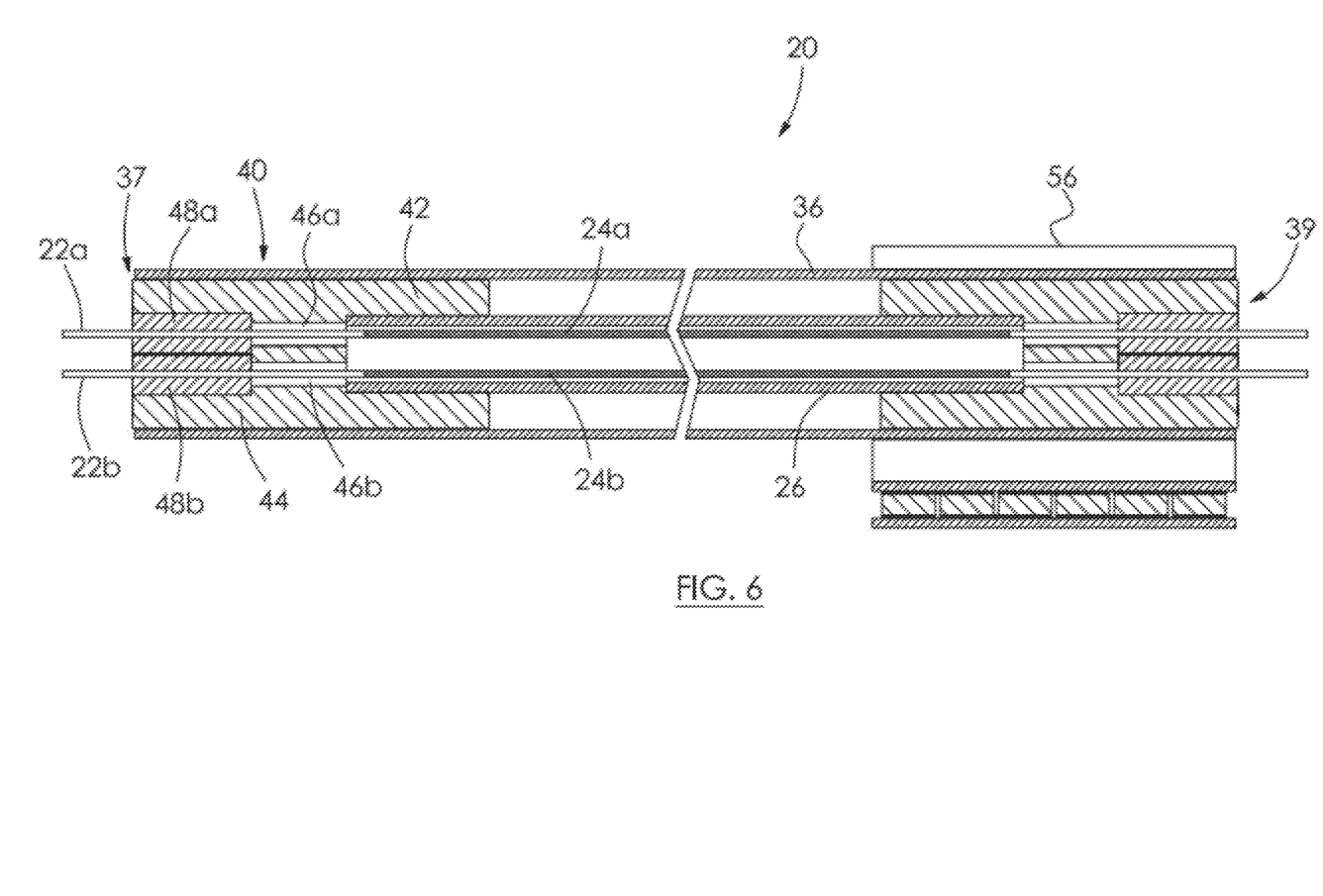
FIG. 6 is a longitudinal cross-sectional side view of an assembly for applying a temperature gradient according to another embodiment of the present invention.

Referring to FIG. 6, there is shown another embodiment of the invention where the assembly 20 houses two optical fiber section 22a and 22b, each provided with a corresponding grating 24a and 24b therealong. Such an embodiment may for example be useful for dispersion compensators such as taught in U.S. Pat. No. 6,937,793, issued on Aug. 30, 2005, the contents of which are incorporated herein by reference in its entirety. Of course, three or more optical fiber sections may be provided within the assembly without departing from the scope of the invention.

In the illustrated embodiment of FIG. 6, a pair of heat conductive inserts 40 is provided, each at one extremity of the assembly 20. Each insert 40 has a ring portion 42 extending between the inner and outer enclosures 26 and 36, and a cap portion 44 sealing the corresponding end of the outer enclosure 36 outwardly of the inner enclosure 26. The ring portion 42 projects from the cap portion 44, both preferably being integral to a monolithic structure made of an appropriate metallic or other thermally conductive material, such as for example Ag, Cu, Al, or any high thermal conductivity alloy. A fiber passage 46a, 46b extends through the cap portion 44 for each section of optical fiber 22a and 22b enclosed within the assembly 20. Further preferably, each section of optical fiber 22a, 22b is held by a corresponding a pair of ferrules 48a, 48b at a corresponding one of the ends 37 and 39 of the outer enclosure 36, the cap portion 44 of each insert having a ferrule channel 50 therein for receiving one of the ferrules 48a, 48b. The ferrules 48a, 48b are preferably made of a low thermal expansion material such as for example ceramic, Kovar®, titanium or the like, to reduce thermal stresses on the fiber. In this embodiment the fiber or fibers are directly coupled to the thermal expansion or contraction of the inner enclosure 26, therefore amplifying the wavelength tuning when the mean temperature of the system is modified. A strain relief (not shown), can be applied to one of the extremities fiber input and output to reduce the risk of breakage. The strain relief can be made of various flexible material, such a silicon adhesives or any low modulus adhesives.

Figure 5:
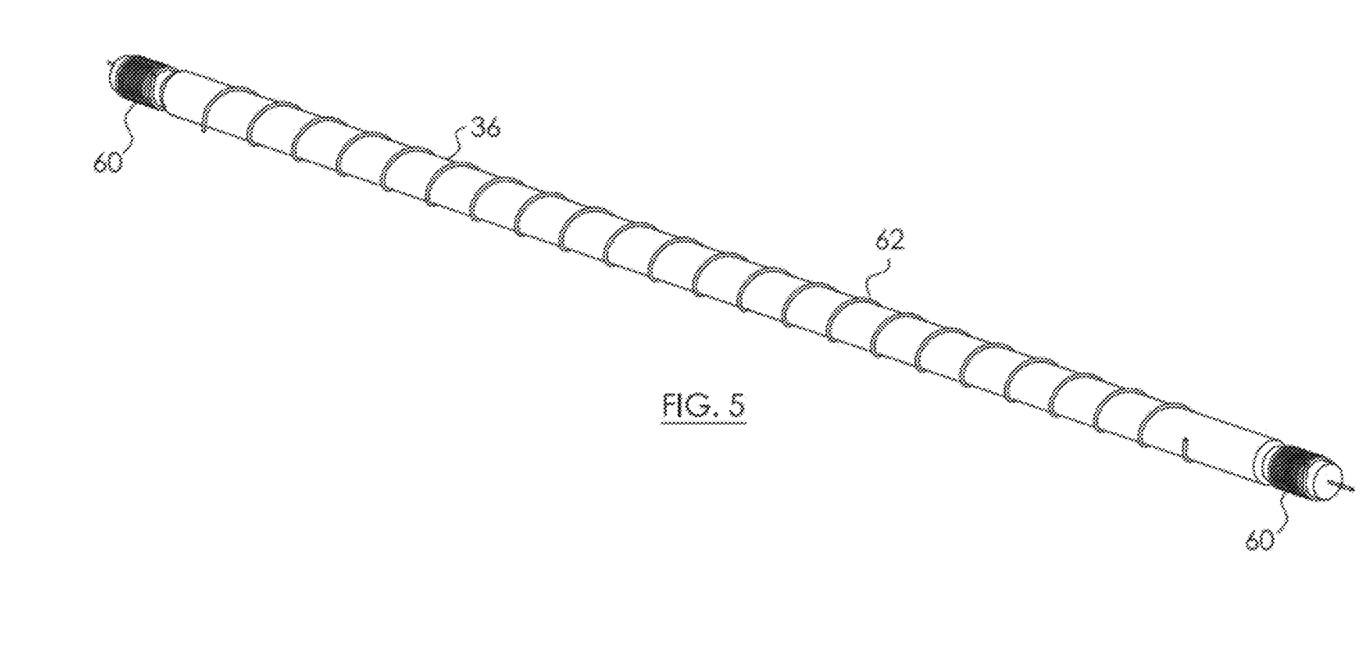
FIG. 5 is a perspective side view of an assembly for applying a thermal gradient according to an embodiment of the invention.

As mentioned above an appropriate heat exchanging system applies a temperature gradient between the first and second ends of the insulating outer enclosure. The thermal source for heating or cooling the device can include, without being limited to, thermo-electric coolers, resistive wires, resistive elements, etc. In the illustrated embodiments of FIGS. 4 and 5, the resistive elements 60 are resistive wires coiled around the extremities of the outer enclosure and controlled to impose the desired temperature values $T_1$ and $T_2$ to both extremities, respectively. Of course, temperature sensors 64 may be positioned at any desired point or points along the assembly. In one embodiment, shown here in FIG. 5, an optional heating element 62 may be further provided to uniformly heat the exterior wall of the outer enclosure 36, preferably at a temperature equal to the middle value between temperatures $T_1$ and $T_2$, possibly offset by a given constant to take into account the ambient temperature ($T_c=(T_1+T_2)/2+$ cte). This added heating element can help protect the outer enclosure from temperature variations of the outside environment. The optional heating element 62 may for example be embodied by a resistive heating wire embedded into the isolating outer enclosure. Such a heating wire can be glued or rolled onto the outer enclosure 36.

Figure 7:
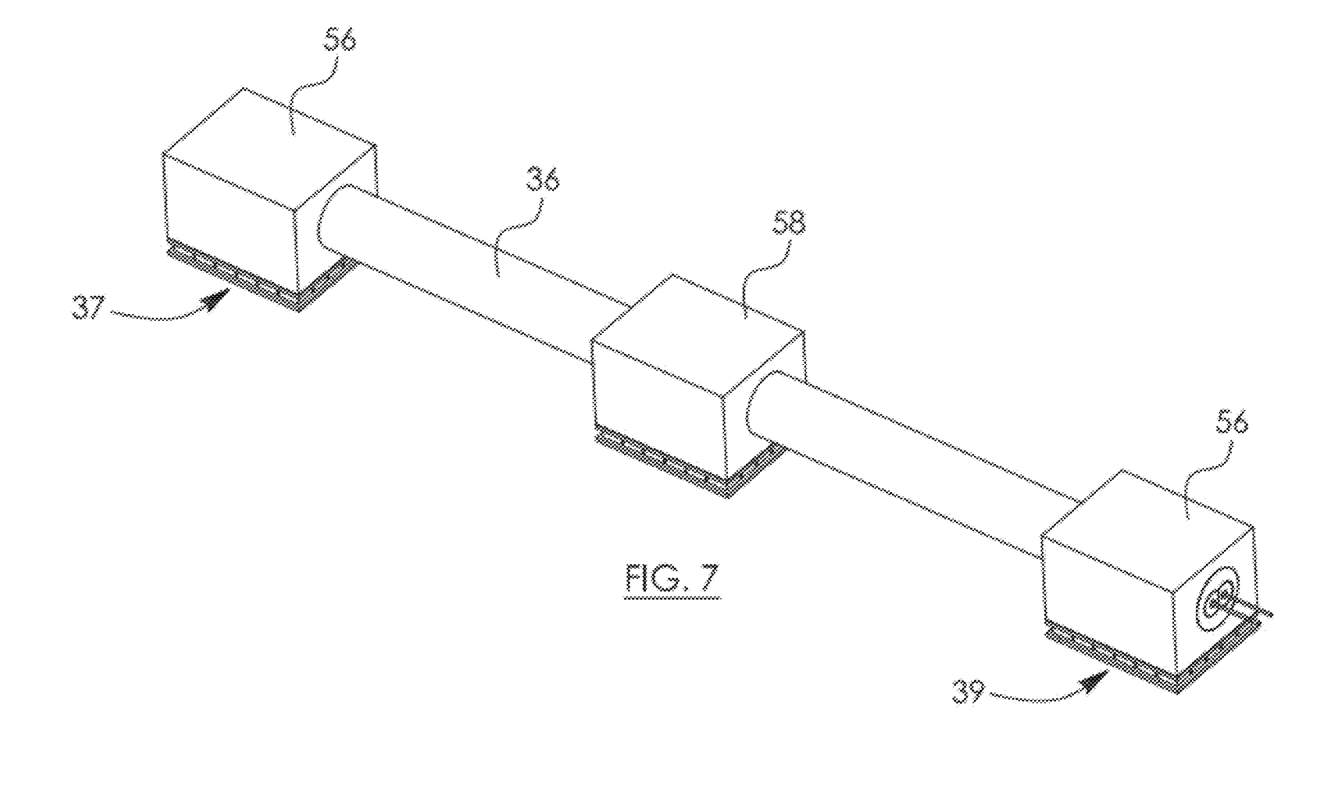
FIG. 7 is a perspective side view of the assembly of FIG. 6.

FIGS. 6 and 7 show another embodiment where the heat exchanging system includes a pair of thermo-electric coolers 56 respectively in contact with the first and second opposite ends 37 and 39 of the outer enclosure 36. The thermo-electric coolers 56, or TECs, therefore keep the respective ends 37 and 39 of the outer enclosure 36 at different temperatures, to impose the desired temperature gradient along the outer enclosure 36. Optionally, one or more additional thermoelectric coolers 58 may be provided in contact with the outer enclosure 36 and intermediate positions between the ends 37 and 39 thereof, which may help further improve the linearity of the temperature gradient therealong. By way of example, a single additional TECs 58 is shown at the mid-point between the two ends 37 and 39 of the outer enclosure 36 in the embodiment illustrated at FIG. 7.

It will be noted that embodiments of the assembly can be combined with a mechanical strain assembly for applying a strain to the optical fiber. Such a combination could provide an improved, compact and versatile device for a number of applications, such as for example discussed in the '779 application. In addition, additional components could be added to the assembly as described herein without departing from the scope of the invention. In one variant, one or more supplemental outer enclosure could be provided concentric to the inner and outer enclosures of the invention, each supplemental outer enclosure providing an additional isolation chamber and another degree of isolation between the optical fiber and its surrounding environment.

In summary, embodiments of the present invention provide significant advantages, such as:
- a good isolation from the environment, especially when the exterior side of the inner enclosure is uniformly heated (Immunizes from effects from Too);
- a more linear thermal response, i.e. lesser deformations of the internal gradient due to heat exchange (reduces S curvature effect) as compared to prior art, such as, for example U.S. Pat. No. 5,671,307, issued on Sep. 23, 1997;
- lower power consumption;
- larger temperature ranges; and
- larger gradients, which in turn allow larger tuning ranges.

In addition, all of the operating temperatures ($T_1$, $T_2$, and $T_c$ can be offset and used as a parameter allowing the tuning of operation wavelength. This in turn can reduce the total size of a tuning device, by including the wavelength tuning with a more practical temperature range of operation, and increases versatility.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. An assembly for applying a temperature gradient to a refractive index grating provided in a section of an optical fiber, said assembly comprising:
    a heat conductive inner enclosure having opposite ends and a longitudinal axis extending therebetween, said inner enclosure defining a cavity therein extending along said longitudinal axis and receiving said section of the optical fiber therethrough;
    a heat conductive outer enclosure provided around said inner enclosure and having opposite ends, each end of the outer enclosure being in thermal contact with a corresponding one of the ends of the inner enclosure, said outer enclosure defining an insulation chamber surrounding said inner enclosure; and
    a heat exchanging system for imposing a temperature gradient along the outer enclosure.

2. The assembly according to claim 1, further comprising a pair of heat conductive inserts each comprising a ring portion extending between the inner and outer enclosures at one of the respective ends thereof.

3. The assembly according to claim 2, wherein the heat conductive inserts each comprise a cap portion from which projects said ring portion, the cap portion sealing the corresponding end of the outer enclosure outwardly of the inner enclosure, said cap portion having a fiber passage extending therealong to allow the optical fiber therethrough.

4. The assembly according to claim 3, further comprising a pair of insulating ferrules each holding said optical fiber at a corresponding one of the ends of the outer enclosure, the cap portion of each heat conductive insert having a ferrule channel therein for receiving one of said ferrules.

5. The assembly according to claim 1, wherein the corresponding ends of the inner and outer enclosures are sealed together.

6. The assembly according to claim 5, wherein the sealing of the corresponding ends of the inner and outer enclosures together comprises at least one of a gluing, crimping, soldering, brazing and press fitting bond.

7. The assembly according to claim 1, further comprising a pair of insulating ferrules each holding said optical fiber at a corresponding one of the ends of the outer enclosure.

8. The assembly according to claim 1, wherein the inner enclosure has an exterior surface provided with a mirror finish.

9. The assembly according to claim 1, wherein the heat exchanging system comprises a pair of thermo-electric coolers respectively in contact with said opposite ends of the outer enclosure, said thermo-electric coolers keeping the respective ends of the outer enclosure at different temperatures, thereby imposing said temperature gradient along the outer enclosure.

10. The assembly according to claim 9, wherein the heat exchange system further comprises at least one additional thermo-electric cooler, each additional thermo-electric cooler being in contact with the outer enclosure and an intermediate position between the ends thereof.

11. The assembly according to claim 1, wherein the heat exchanging system comprises a pair of resistive elements respectively in contact with said opposite ends of the outer enclosure, said resistive elements keeping the respective ends of the outer enclosure at different temperatures, thereby imposing said temperature gradient along the outer enclosure.

12. The assembly according to claim 11, wherein each of said resistive elements comprises a resistive wire coiled around the corresponding end of the outer enclosure.

13. The assembly according to claim 1, further comprising at least one heating element uniformly heating the outer enclosure between the opposite ends thereof.

14. A chromatic dispersion compensator, comprising:
   at least one section of optical fiber, each of said at least one section of optical fiber having a refractive index grating therealong; and
   an assembly for applying a temperature gradient to the refractive index grating in each of said at least one section of optical fiber, said assembly comprising:
      a heat conductive inner enclosure having opposite ends and a longitudinal axis extending therebetween, said inner enclosure defining a cavity therein extending along said longitudinal axis and receiving each of said at least one section of optical fiber therethrough,
      a heat conductive outer enclosure provided around said inner enclosure and having opposite ends, each end of the outer enclosure being in thermal contact with a corresponding ends of the inner enclosure, said outer enclosure defining an insulation chamber surrounding said inner enclosure, and
      a heat exchanging system for imposing a temperature gradient along the outer enclosure.

15. The chromatic dispersion compensator according to claim 14, wherein said at least one section of optical fiber consists of two sections of optical fiber.

16. The chromatic dispersion compensator according to claim 15, wherein the assembly for applying a temperature gradient further comprises a pair of heat conductive inserts each comprising a ring portion extending between the inner and outer enclosures at one of the respective ends thereof.

17. The chromatic dispersion compensator according to claim 16, wherein the heat conductive inserts each comprise a cap portion from which projects said ring portion, the cap portion sealing the corresponding end of the outer enclosure outwardly of the inner enclosure, said cap portion having two fiber passages extending therealong to allow the optical fibers therethrough.

18. The chromatic dispersion compensator according to claim 17, wherein the assembly for applying a temperature gradient further comprises two pairs of insulating ferrules, each ferrule holding one of said optical fibers at a corresponding one of the ends of the outer enclosure, the cap portion of each heat conductive insert having two ferrule channels therein each for receiving one of said ferrules.

19. The chromatic dispersion compensator according to claim 14, wherein the heat exchanging system comprises a pair of thermo-electric coolers respectively in contact with said opposite ends of the outer enclosure, said thermo-electric coolers keeping the respective ends of the outer enclosure at different temperatures, thereby imposing said temperature gradient along the outer enclosure.

20. The chromatic dispersion compensator according to claim 19, wherein the heat exchange system further comprises at least two additional thermo-electric coolers, each additional thermo-electric cooler being in contact with the outer enclosure and an intermediate position between the ends thereof.

* * * * *